(12) United States Patent
Heilmann

(10) Patent No.: US 6,769,847 B1
(45) Date of Patent: Aug. 3, 2004

(54) LOW PROFILE ANCHOR ASSEMBLY

(76) Inventor: Joseph John Heilmann, 14525 Bluebird Trail, NE., Prior Lake, MN (US) 55372

(*) Notice: Subject to any disclaimer, the term of this patent is extended or adjusted under 35 U.S.C. 154(b) by 0 days.

(21) Appl. No.: 10/446,329

(22) Filed: May 28, 2003

(51) Int. Cl.[7] .................................................. B60P 7/06
(52) U.S. Cl. ....................................... 410/104; 410/101
(58) Field of Search .......................... 410/96, 101, 104, 410/105; 248/499; 24/115 K, 265 CD

(56) References Cited

U.S. PATENT DOCUMENTS

| | | | | |
|---|---|---|---|---|
| 4,248,558 A | * | 2/1981 | Lechner | 410/104 |
| 5,674,033 A | * | 10/1997 | Ruegg | 410/104 |
| 6,409,063 B1 | * | 6/2002 | Kmita et al. | 224/321 |
| 2002/0048495 A1 | * | 4/2002 | Anderson et al. | 410/104 |

FOREIGN PATENT DOCUMENTS

JP            363074740 A  *  4/1988  ................. 410/104

* cited by examiner

Primary Examiner—D. Glenn Dayoan
Assistant Examiner—H. Gutman
(74) Attorney, Agent, or Firm—Michael A. Mochinski

(57) ABSTRACT

A low profile anchor assembly for anchoring cargo and the like to a carrier's surface integrally equipped with a T-slotted track having a pair of inwardly extending flanges and a pair of sidewalls extending upwardly from a base plate, collectively forming a T-shaped spatial opening. The anchor assembly comprising a top track plate having first and second apertures configurably aligned along the centerline and longitudinal axis thereof for receiving therethrough an end of a cargo strap and a bolt, respectively; and a bottom track plate having a threaded aperture and a track spacer having a non-threaded aperture, each aperture being selectively aligned with the second aperture to permit passage of the bolt, effectively serving as mechinism for tighteningly securing the anchor assembly to the T-slotted track.

19 Claims, 5 Drawing Sheets

LOW PROFILE ANCHOR ASSEMBLY

FIELD OF THE INVENTION

The present invention relates in general to a low profile anchor assembly geometrically configured to slidably fit within the geometric confines of a standard track system integrally made part of a carrier's surface. More specifically, the present invention provides means to adaptably anchor cargo such as recreational vehicles, machines or equipment to a carrier's surface without the requirement of removing or repositioning the anchor assembly during instances of loading and unloading the aforementioned cargo.

BACKGROUND OF THE INVENTION

The art offers a wide range of devices for anchoring cargo and the like to a carrier's surface or walls insofar to prevent unintentional movement of the cargo during moments of transport. The most conventional form of anchoring device simply comprises an eyebolt of the type having an end threadably screwed into the carrier's surface, which suitably remains stationary thereabout to readily accept a strap or rope end. In other anchoring devices comprising more sophisticated features, one end of the anchor may be geometrically configured to fit within the geometric confines of a channel or slotted track system, while the opposite end may comprise features similar to that of the eyebolt, namely an open-ended hook or a closed-ended eye extending above the carrier's surface. This type of anchoring configuration is best illustrated in U.S. Pat. No. 4,248,558 issued to Lechner, wherein a slider block is slidably fitted within a channel and comprises anchoring means extending thereabove a predetermined distance for receiving a strap end of some sort As with most anchoring configurations of this type, the track or channel principally serves as means to slidably move the anchoring device along the entire length thereof to accommodate differing cargo configurations. However, in most instances of their use in the art, the means by which the strap end is affixed to the anchoring device extends well above the carrier's surface, making it rather cumbersome to load and unload cargo and the like. To avoid undue inference with the upwardly extending anchoring device insofar to prevent collateral damage thereto and/or to the cargo, the cargo is loaded onto or unloaded from the carrier's surface without the presence of the anchoring device nearby, generally by means of removal or relocation. After optimally positioning the cargo, the anchoring device is configurably inserted into the T-slotted track assembly and slidably moved therewithin to the desired anchoring location. The strap end is then tighteningly affixed to the upwardly extending end of the anchoring device. This process continues for some time until which time the cargo is adequately secured to the carrier's surface. As one can imagine, this process can take some time to complete, particularly in instances where the cargo is uniquely configured in such a manner to necessitate complete removal of the anchoring device insofar to mitigate the occurrence of damage to both the anchoring assembly and cargo.

In accordance with the present invention, applicant has appreciably devised an anchor assembly which eliminates the necessity of reconfiguring anchor means during moments of loading and unloading of transportable cargo, thus affording an opportunity for optimizing the location of anchoring points for a more secured cargo during transport thereof.

BRIEF SUMMARY OF THE INVENTION

In order to overcome the numerous drawbacks apparent in the prior art, an anchor assembly has been devised for use with a T-slotted track system integrally made part of a carrier's surface.

It is thus an object of the present invention to provide a low cost, non-complicated anchor assembly which may be reliably used to secure equipment, machinery, recreational vehicles and the like to a carrier's surface insofar to prevent inadvertent movement thereof during moments of transport.

It is another object of the present invention to provide such an anchor assembly which can be readily left secured to the track system during the loading and unloading of transportable cargo insofar to optimize the location of anchoring points for a more predictable means of securing cargo.

It is yet another object of the present invention to provide such an anchor assembly which accomplishes the foregoing and other objects and advantages and which is economical, durable, and fully effective in performing its intended functions.

In accordance with the present invention, an anchor assembly has been devised for use with a T-slotted track assembly integrally made part of a carrier's surface, the anchor assembly comprising in combination a top track plate preferably of rectangular form and having a first aperture extending therethrough to readily accept and receive an end of a strap or rope affixed with or without an anchor fastener and a second aperture to permit passage of a bolt used as partial means for fastening the anchor assembly to the T-slotted track; a track spacer having a non-threaded aperture of which is aligned with that of the second aperture of the top track plate while in an assembled state; and a bottom track plate having a threaded aperture extending therethrough to accept a threaded portion of the bolt effectively serving as means to move the top and bottom track plates downwardly and upwardly, respectively, toward a pair of inwardly extending flanges made part, of the T-slotted track, the extent of vertical movement of each about the bolt being limited by the dimensional thickness of the track spacer.

Other objects, features, and advantages of the present invention will become apparent in the following detailed description of the preferred embodiments thereof when read in conjunction with the accompanying drawings in which like reference numerals depict the same parts in the various views.

BRIEF DESCRIPTION OF THE SEVERAL VIEWS OF THE DRAWINGS

A preferred embodiment of the present invention will now be described by way of example with reference to the accompanying drawings, in which.

DETAILED DESCRIPTION OF THE PREFERRED EMBODIMENT

While this invention is susceptible of being embodied in many different forms, the preferred embodiment of the invention is illustrated in the accompanying drawings and described in detail hereinafter with the understanding that the present disclosure is to be considered to exemplify the principles of the present invention and is not intended to limit the invention to the embodiments illustrated and presented herein. The present invention has particular utility as a device for securing cargo and the like to a carrier's surface insofar to prevent the occurrence of movement thereof during moments of transport.

Figure 1:
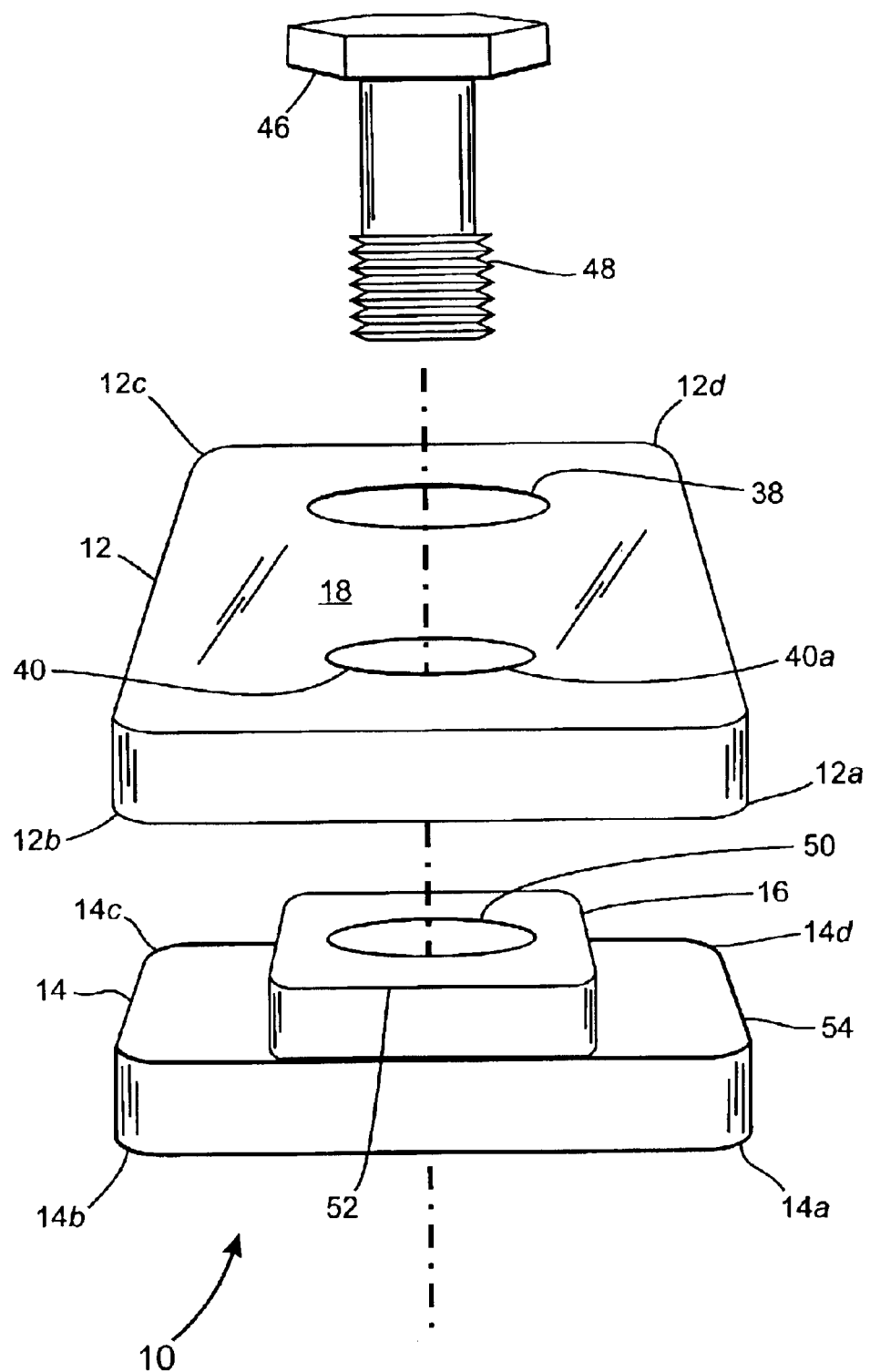
FIG. 1 is an end perspective view of the preferred embodiment of the present invention illustrating a top track plate disassembled from a bottom track plate.
Figure 2:
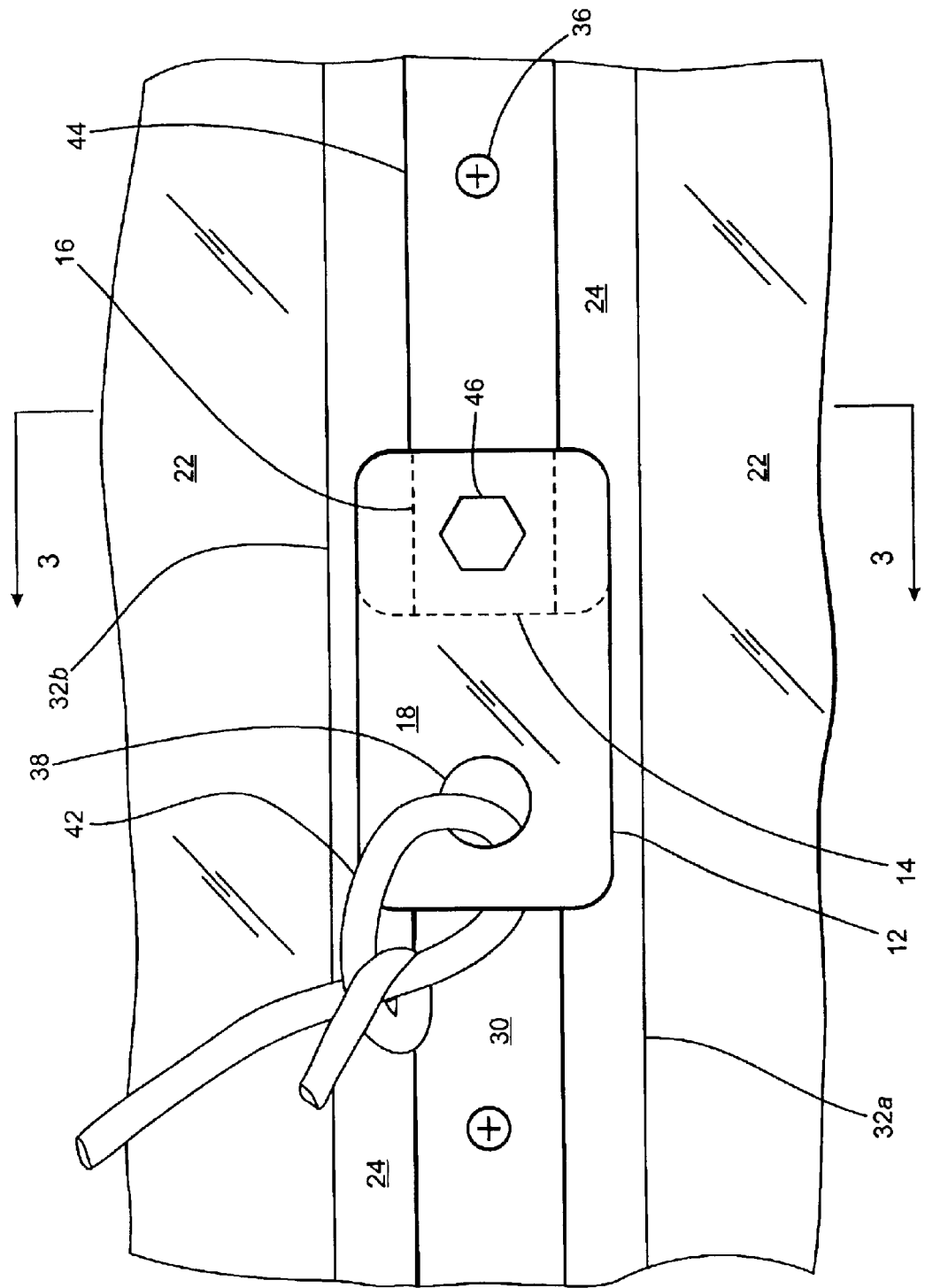
FIG. 2 is a top view of the preferred embodiment of the present invention illustrating a top track plate assembled to a T-slotted track integrally made part of a carrier's surface.
Figure 3:
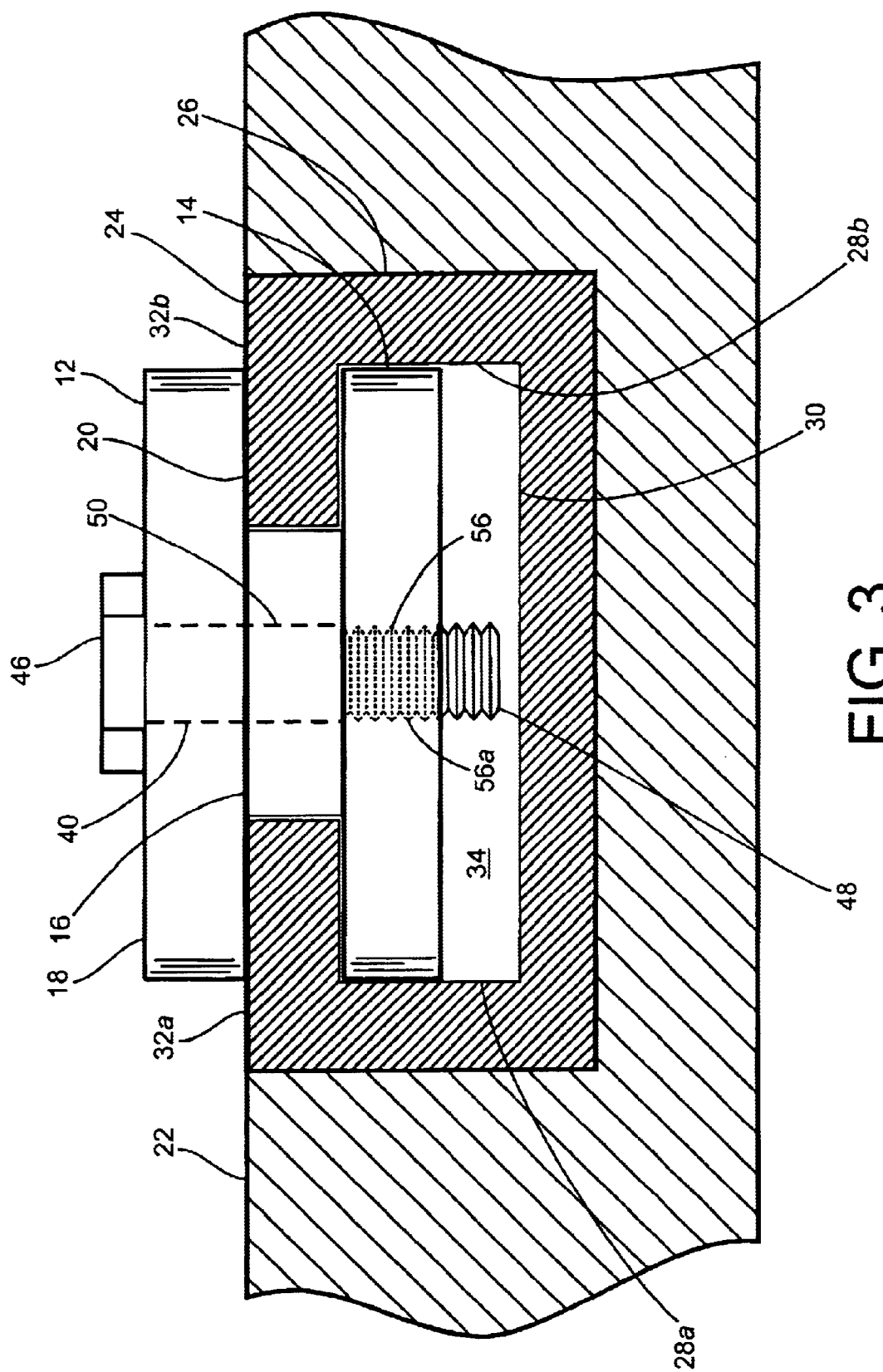
FIG. 3 is a cross sectional view of the preferred embodiment of the present invention taken on line 3—3 of FIG. 2 illustrating an anchor assembly fitted into and configurably arranged within the geometric confines of a T-slotted track.

Referring to FIG. 1, there is shown generally at 10 an anchor assembly comprising top and bottom track plates 12, 14, each being separated in part from one another a predetermined distance by a track spacer 16. In the preferred embodiment, the top track plate most resembles a flattened rectangular plate comprising upper and lower planer surfaces 18, 20 and four corners 12a, 12b, 12c, 12d each of which is rounded to a radius of approximately ¼" to safeguard against any damage to the cargo as it is selectively moved about a carrier's surface 22, typically known in the art to be fabricated from a material having non-corrosive properties such as wood, plastic composite or aluminum. The lower planer surface, while in a static, assembled state, engagingly mates with a top portion 24 of a T-slotted track 26 of the type integrally made part of the carrier's surface, whereas the upper planer surface 18 is positionally configured to face upwardly from the carrier's surface. As shown in FIG. 2, the T-slotted track of the type generally known and made readily available in the art extends longitudinally about the carrier's surface, with the top portion of the track substantially configured to exist flush with the carrier's surface 22 to accommodate the loading and unloading of cargo without undue interference therefrom. The T-slotted track of the type depicted herein preferably comprises a pair of sidewalls 28a, 28b extending upwardly from a base plate 30, generally perpendicular therefrom, and a pair of flanges 32a, 32b extending inwardly from the sidewalls, collectively forming a T-shaped spatial opening 34, as best illustrated in FIG. 3. In most applications of its use, the T-slotted track 26 is anchored to the carrier's surface by a plurality of screws 36 extending through and equally spaced about the base plate 30 and threadably into the carrier's surface 22. Depending on the spatial requirements of the cargo, the carrier's surface may comprise one or more of the T-slotted tracks embedded therein.

Figure 4:
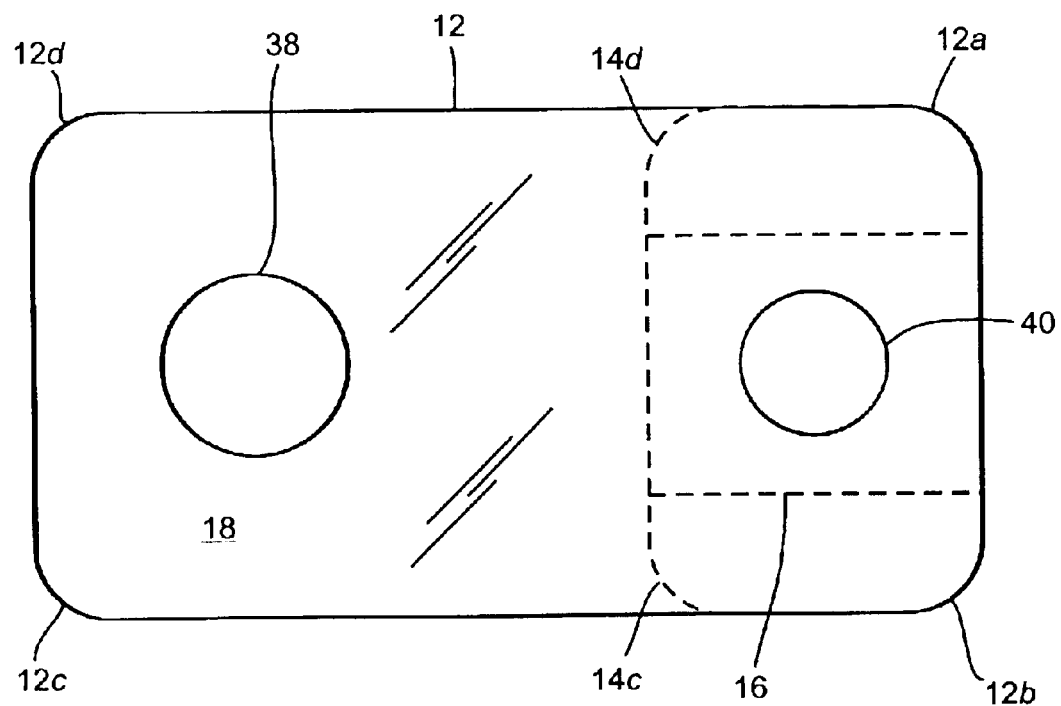
FIG. 4 is a top view of the preferred embodiment of the present invention illustrating a top track plate comprising means for connecting a strap or rope end.
Figure 5:
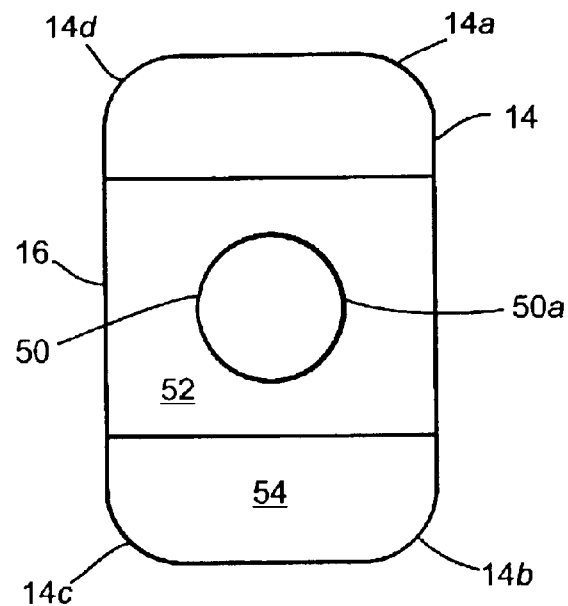
FIG. 5 is a top view of the preferred embodiment of the present invention illustrating a track spacer situated atop and integrally made part of a bottom track plate.
Figure 6:
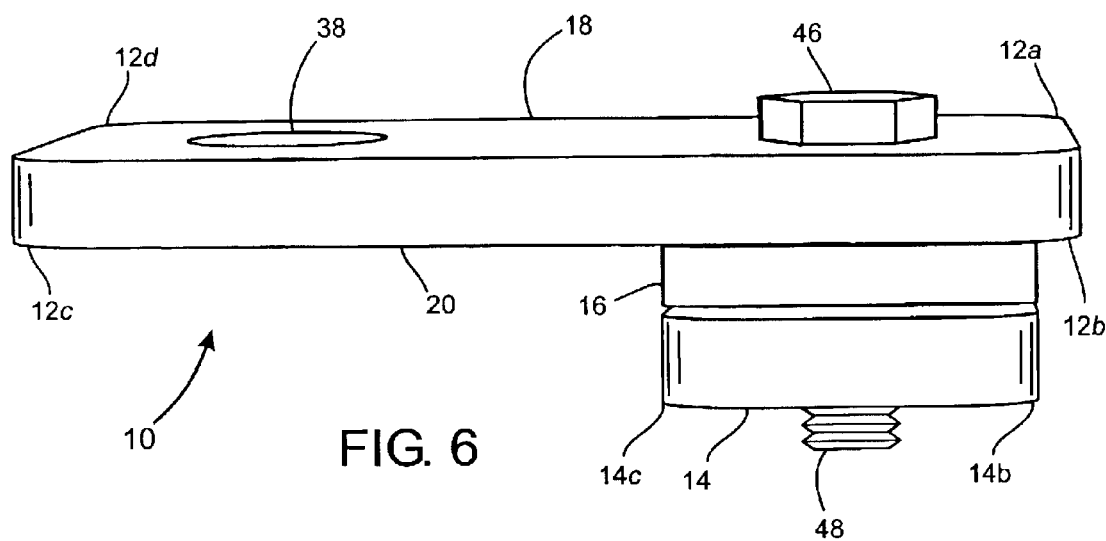
FIG. 6 is side perspective view of the preferred embodiment of the present invention illustrating a top track plate assembled to a bottom track plate integrally fitted with a track spacer.
Figure 7:
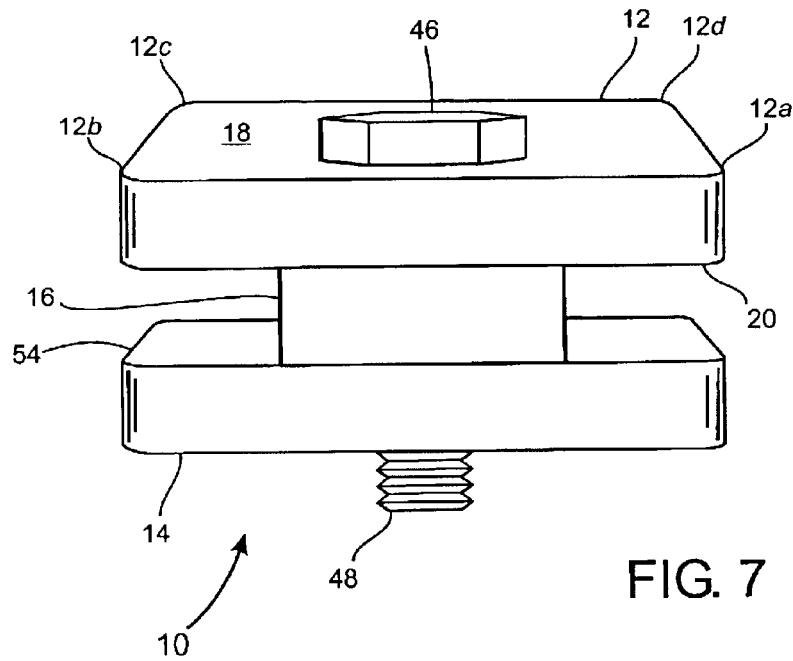
FIG. 7 is end perspective view of the preferred embodiment of the present invention illustrating a top track plate assembled to a bottom track plate integrally fitted with a track spacer.

Referring now to FIG. 4, the top track plate 12 further comprises first and second apertures 38, 40 extending therethrough, the first of which serves as means for securing an end of a strap or rope 42 to the anchor assembly 10 and the second serving as partial means for attaching the anchor assembly to the T-slotted track assembly. The first aperture 38 is primarily located along the centerline and longitudinal axis of the top track plate and aligned with that of the second aperture 40 and a longitudinal spatial opening 44 formed by the inwardly extending flanges 32a, 32b of the T-slotted track 26. This spatial configuration suitably allows the strap end affixed with or without an anchor fastener to be readily accommodated within the geometric confines of the T-shaped spatial opening 34 of the T-slotted track, thus maintaining the low profile characteristics of the anchor assembly. As shown in FIG. 1, the second aperture 40 primarily serves as a passageway for a bolt 46 having one end that is threaded 48 and is preferably aligned with an aperture 50 extending through the track spacer 16 while in an assembled state. Given the need to slidably move the anchor assembly 10 about the T-slotted track 26 from time to time, particularly in instances of its use to accommodate differing cargo configurations, the second aperture 40 as well as the track spacer aperture 50 comprises non-threaded walls 40a, 50a, respectively, to permit free, vertical movement of the top track plate about the non-threaded portion of the bolt 46 as it is loosened from the anchor assembly. Similar to the first and second apertures 38, 40 in terms of their location about the upper track plate 12, the track spacer aperture is centrally located about the track spacer 16 insofar to further position the anchor assembly 10 centrally about the T-slotted track 26. As illustrated in FIGS. 3 and 5, the track spacer is geometrically configured to be situated within the longitudinal spatial opening 44 formed by the inwardly extending flanges 32a, 32b of the T-slotted track 26, primarily serving as means to guide the anchor assembly as it slidably moves about and along the T-slotted track and to prevent inadvertent damage to the inwardly extending flanges as the anchor assembly 10 is tighteningly secured to the T-slotted track. Given the configuration of the track spacer to acquire its desired function, it is preferred that the thickness thereof is substantially equivalent to or slightly less than the thickness of the material used to form the inwardly extending flanges 32a, 32b. The track spacer 16, as depicted in FIGS. 5, 6 and 7, preferably comprises an upper surface 52 which engagingly mates with a portion of the lower planer surface 20 of the top track plate 12 as the bolt 46 is threadably tightened to the bottom track plate 14 to secure the anchor assembly 10 to the T-slotted track 26.

Integrally connected to the track spacer is the bottom track plate 14 which primarily serves as means to lock and secure the anchor assembly to the T-slotted track 26. Like the top track plate, the bottom track plate resembles a flattened plate of rectangular form having four corners 14a, 14b, 14c, 14d each of which comprises a radius of approximately ¼" to prevent racking and binding of the anchor assembly as it slidably moves along and within the confines of the T-shaped spatial opening 34. As illustrated in FIGS. 3 and 5, the bottom track plate 14 further comprises a top surface 54 and an aperture 56 extending therethrough to accept a portion of the bolt 46 and is centrally located thereabout to equally distribute the bottom track plate within the T-shaped spatial opening 34, most near the base plate 30 of the T-slotted track 26. Unlike the second aperture and the track spacer aperture, the bottom track plate aperture comprises threaded walls 56a to accommodate the threaded end 48 of the bolt 46. The combined features of the bolt 42 and bottom track plate aperture permit the bottom track plate 14 to move upwardly along the bolt, thus simultaneously allowing the top track plate to move downwardly toward the inwardly extending flanges of the T-slotted track. 26. In its final tightened state, as depicted in FIG. 3, the top and bottom track plates 12,. 14 will substantially engage and compress the top and under sides of the inwardly extending flanges 32a, 32b, respectively. The extent to which the top and bottom tracks compress the inwardly extending flanges of the T-slotted track is substantially limited to the dimensional thickness of the track spacer as noted hereinbefore.

In operation, the anchor assembly 10 is longitudinally positioned over the T-slotted track, with the bottom track plate 14 and track spacer 16 being situated within the confines of the longitudinal spatial opening 44 of the T-slotted track and downwardly moved toward the base plate 30 until the bottom track plate and track spacer are collectively housed within the T-shaped spatial opening 34 and the lower planer surface 20 engages the top portion 24 of the T-slotted track, as best illustrated in FIG. 3. The bottom track plate is then selectively rotated until a portion thereof extends below the inwardly extending flanges, generally being accomplished by rotating the head of the bolt. After selectively moving the top and bottom track plates to their desired position, the bolt 46 is simply tightened to allow the bottom track plate to move upwardly along the longitudinal path of the bolt, toward the inwardly extending flanges 32a, 32b, and is further tightened until the top and bottom track plates substantially engage and compress the inwardly extending flanges. In preferred applications, the longitudinal axis of the bottom track plate is selectively positioned perpendicular to the sidewalls 28a, 28b to gain maximum surface area in contact with the T-slotted track 26 for greater cargo holding strength.

It can be seen from the foregoing that there is provided in accordance with this invention a simple and easily operated device, which is particularly suitable for anchoring cargo to a carrier's surface 22 of the type comprising one or more T-slotted tracks 26 configurably embedded therein. The anchor assembly 10 is completely functional in terms of securing cargo to the carrier's surface without the necessity of removing the anchor assembly during activities of loading and unloading of transportable cargo to the likes of all terrain vehicles, snowmobiles, machinery and so forth. It is obvious that the components comprising the anchor assembly 10 may be fabricated from a variety of materials, providing such selection or use of materials that possesses the capacity to remain rigid throughout its duration of use in securing cargo to the carrier's surface. It is most desirable, and therefore preferred, to construct the anchor assembly 10 from carbon steel to ensure sustained reliability during use thereof, as hereinbefore stated. In other applications not necessarily noted herein, the anchor assembly may be fabricated from aluminum or stainless steel to guard against undue, premature deterioration while being utilized in a corrosive environment.

While there has been shown and described a particular embodiment of the invention, it will be obvious to those skilled in the art that various changes and alterations can be made therein without departing from the invention and, therefore, it is aimed in the appended claims to cover all such changes and alterations as fall within the true spirit and scope of the invention.

What is claimed is:

1. An anchor assembly for anchoring cargo to a T-slotted track having a pair of inwardly extending flanges and a pair of sidewalls extending upwardly from a base plate, collectively forming a T-shaped spatial opening, said anchor assembly comprising, in combination:
   a top track plate having a first aperture for receiving therethrough an end of a strap constituting partial means for securing the cargo to a carrier's surface; and
   means for anchoring said top track plate to the T-slotted track;
   wherein said anchoring means comprises a bottom track plate having a threaded aperture and a track spacer having a non-threaded aperture each being housed within the geometric confines of the T-shaped spatial opening said top track plate having a second aperture selectively being aligned with the threaded and non-threaded apertures of said bottom track plate.

2. An anchor assembly as set forth in claim 1, wherein the first and second apertures of said top track plate each comprise non-threaded walls.

3. An anchor assembly as set forth in claim 1, wherein the first and second apertures are collectively aligned along the centerline and longitudinal axis of said top track plate insofar to be spatially situated midway between the sidewalls of the T-slotted track.

4. An anchor assembly as set forth in claim 1, wherein said top track plate comprises four corners each being rounded to a predetermined radius to mitigate the occurrence of damage to the cargo as it is selectively moved about the carrier's surface, over said top track plate.

5. An anchor assembly as set forth in claim 4, wherein said top track plate corners each comprise a radius of approximately ¼ of an inch.

6. An anchor assembly as set forth in claim 1, wherein said top track plate comprises upper and lower planer surfaces, said lower planer surface being substantially in contact with the pair of inwardly extending flanges while said anchor assembly is adaptably fitted to the T-slotted track.

7. An anchor assembly as set forth in claim 1, wherein said top and bottom track plates and said track spacer are collectively fabricated from carbon steel.

8. An anchor assembly as set forth in claim 1, wherein said bottom track plate comprises four corners each being rounded to a radius of approximately ¼ of an inch to mitigate the occurrence of racking and binding thereof while being slidably positioned along the T-slotted track.

9. A method for anchoring cargo to a T-slotted track having a pair of inwardly extending flanges and a pair of sidewalls extending upwardly from a base plate, collectively forming a T-shaped spatial opening, said method comprising the steps of:
   positioning a top track plate over and longitudinally about the T-slotted track, said top track plate having first and second apertures for receiving therethrough an end of a strap and a bolt, respectively;
   fitting a track spacer below said top track plate equidistantly between the pair of inwardly extending flanges, said track spacer having an aperture extending therethrough for housing a non-threaded portion of the bolt;
   situating a bottom track plate longitudinally in between the pair of inwardly extending flanges and downwardly positioning said bottom track plate equidistantly between the pair of sidewalls, said bottom track plate having a threaded aperture for threadably accepting a threaded portion of the bolt;
   rotating said bottom track plate until a portion thereof substantially extends below the pair of inwardly extending flanges; and
   tightening said bolt until said top and bottom track plates substantially engage and compress the inwardly extending flanges to lock said top track plate to the T-slotted track.

10. A method as set forth in claim 9, further comprising the step of positioning the longitudinal axis of said bottom track plate perpendicular to the pair of sidewalls.

11. A method as set forth in claim 9, wherein said track spacer and bottom track plate are integrally connected together and housed within the geometric confines of the T-shaped spatial opening.

12. A method as set forth in claim 9, wherein said track spacer comprises a dimensional thickness substantially equivalent to the thickness of the inwardly extending flanges.

13. An anchor assembly for anchoring cargo to a carrier's surface integrally equipped with a T-slotted track having a pair of inwardly extending flanges and a pair of sidewalls extending upwardly from a base plate, collectively forming a T-shaped spatial opening, said anchor assembly comprising, in combination:

a top track plate having a first aperture for receiving therethrough an end of a cargo strap and an upper planer surface to permit travel of the cargo thereover without undue hindrance therefrom; and a bottom track plate having a threaded aperture and a track spacer having a non-threaded aperture collectively being housed within the geometric confines of the T-shaped spatial opening, said top track plate having a second aperture selectively being aligned with the threaded and non-threaded apertures of said bottom track plate and said track spacer, respectively, to receive and permit passage of a bolt having a threaded end threadably fitted into the threaded aperture.

14. An anchor assembly as set forth in claim 13, wherein the first and second apertures are collectively aligned along the centerline and longitudinal axis of said top track plate insofar to be spatially situated midway between the sidewalls of the T-slotted track.

15. An anchor assembly as set forth in claim 13, wherein said top track plate, comprises four corners each being rounded to a predetermined radius to mitigate the occurrence of damage to the cargo as it is selectively moved about the carrier's surface, over said top track plate.

16. An anchor assembly as set forth in claim 15, wherein said top track plate corners each comprise a radius of approximately ¼ of an inch.

17. An anchor assembly as set forth in claim 13, wherein said top and bottom track plates and said track spacer are collectively fabricated from carbon steel.

18. An anchor assembly as set forth in claim 13, wherein said track spacer and bottom track plate are integrally connected together and housed within the geometric confines of the T-shaped spatial opening.

19. An anchor assembly as set forth in claim 13, wherein said bottom track plate comprises four corners each being rounded to a radius of approximately ¼ of an inch to mitigate the occurrence of racking and binding thereof while being slidably positioned along the T-slotted track.

* * * * *